Nov. 14, 1933.  E. WIST  1,935,593
METHOD OF AND MEANS FOR CONVERTING THE
ELECTRIC ARC INTO AN ELONGATED FLAME
Filed March 28, 1929

Inventor:
Engelbat Wist

Patented Nov. 14, 1933

1,935,593

UNITED STATES PATENT OFFICE 1,935,593

METHOD OF AND MEANS FOR CONVERTING THE ELECTRIC ARC INTO AN ELONGATED FLAME

Engelbert Wist, Vienna, Austria, assignor to the firm Presslicht-Patentverwertungsges m. b. H., Vienna, Austria Application March 28, 1929, Serial No. 350,582, and in Austria February 26, 1929

8 Claims. (Cl. 219—8)

This invention relates to a method of and means for converting the electric arc into an elongated flame suitable for welding and heating as well as for chemical and metallurgical purposes, and the invention consists essentially in forming the arc between concentric carbon electrodes and passing a blast of gaseous hydrocarbon across the arc from between the electrodes.

The gas is adapted to be decomposed by the arc and to deposit carbon on the electrodes so as to retard the consumption of the latter, while the gas mixture obtained by the reaction will neutralize the flame and render it more efficient and suitable for the various purposes for which it is employed.

In order to prevent an excessive deposition of carbon on the electrodes, a hydro-carbon compound containing oxygen is preferably employed.

Figure 1:
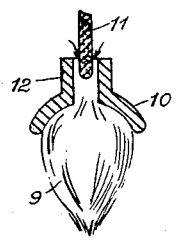
Figure 2:
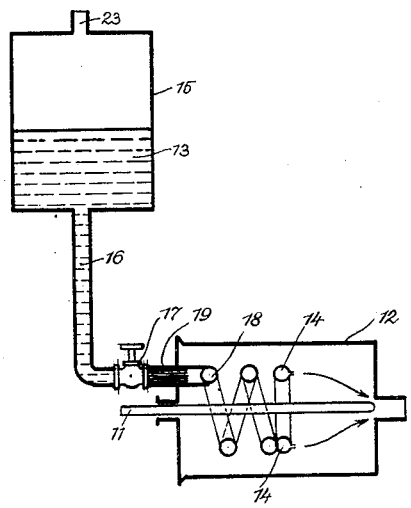
Figure 3:
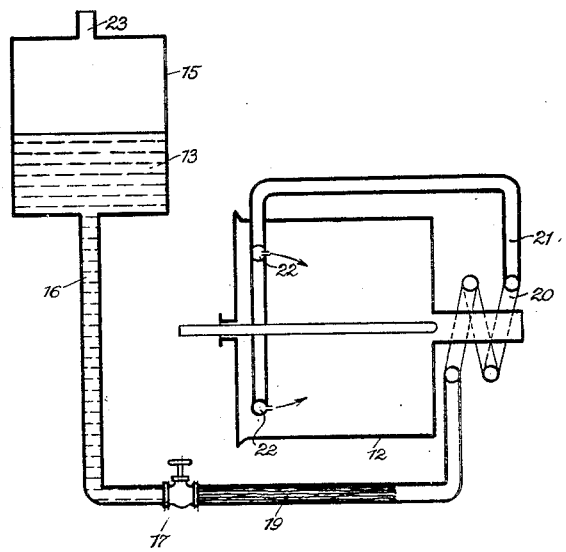

Fig. 1 of the accompanying drawing represents a sectional view of a suitable form of electrodes, Fig. 2 is a diagrammatic view of a device for carrying out the invention including an arrangement for producing the gas, and Fig. 3 is a diagram of a modified arrangement.

The electric arc is formed between concentric carbon electrodes 11 and 12 and subjected to a blast of gas which passes across the arc from between the electrodes. The consumption of the electrodes is reduced by employing for the blast a gaseous hydro-carbon compound adapted to be decomposed by the arc and to deposit carbon on the incandescent parts of the electrodes. By this arrangement the flame will also be neutralized and produce an ideal welding joint. In order to restrict the carbon deposition, the gas may be mixed with oxygen. A mixture of coal gas and hydrogen or steam may be employed or an alcohol compound for instance ethyl or methyl alcohol with or without water. Owing to this rebuilding of the carbons, a renewal of the latter need not take place except at large intervals.

The gas blast is advantageously obtained from a liquid which is evaporated by the heat, for instance by one of the arrangements shown in Figs. 2 and 3. The liquid 13 is contained in a tank 15 having an air inlet 23, and descends through a pipe 16 to a coil 18 which, according to Fig. 2, surrounds the electrode 11 inside the electrode 12. The gas formed by the heat is emitted from the coil through nozzles 14 and passes out through the arc gap so as to extend the arc into a flame. The nozzles 14 are distributed uniformly about the inner electrode. Between a regulating valve 17 and the coil 18 the pipe 16 may contain retarding elements 19 of any suitable form, for instance a bundle of fine parallel tubes or wires, or a plug of cotton wool, asbestos or the like. By this arrangement the gas will be discharged by the nozzles 14 at a constant pressure and maintain a constant flame.

In the arrangement according to Fig. 3 a pipe coil 20 is arranged outside the reduced end of the outer electrode and connected by means of a pipe 21 to an annular pipe 22 arranged about the electrode 11 inside the electrode 12 and formed with nozzles 22.

The stability and correct shape of the flame 9 may be ensured by providing the outer electrode with a flared mouth which may either be conical or bowl-shaped. Fig. 1 shows the electrode formed with a bowl-shaped mouth 10. The one electrode may consist of a suitable metal.

I claim:

1. A device for converting the electric arc into an elongated flame, comprising a solid and a tubular electrode arranged concentrically, means for passing current through the electrodes so as to form an arc between them, a pipe coil arranged so as to be heated by the arc, a tank connected to one end of the coil for supplying liquid to the latter, and nozzles connected to the other end of the coil and arranged inside the tubular electrode so as to pass the gas produced by the coil across the arc.

2. The structure claimed in claim 1 in combination with a regulating valve arranged in the conduit between the tank and the coil, and means in the same conduit, between the valve and the coil, for retarding the flow of the liquid.

3. A device as claimed in claim 1 wherein the nozzles are arranged symmetrically about the inner, solid electrode.

4. A device as claimed in claim 1 wherein the end of the outer electrode is bowl-shaped.

5. Means for converting an electric arc into an elongated flame, comprising concentric electrodes, between which the arc is formed, the outermost electrode confining the arc against spreading in other than a predetermined direction, and means for directing a gaseous hydrocarbon longitudinally of and within the outer electrode and surrounding the inner electrode and across the arc and in the direction of desired arc elongation.

6. The method of converting an electric arc into an elongated flame, with the arc of a type developed between concentric electrodes, said method consisting in passing a blast of a gas containing hydrocarbon across the electric arc, the decomposition of the gas incident to its passage through the arc depositing carbon on the electrodes.

7. The method of converting an electric arc into an elongated flame, with the arc of a type developed between concentric electrodes, said method consisting in passing a blast of an alcoholic vapor containing carbon across the electric arc, the decomposition of the alcoholic vapor incident to its passage through the arc depositing carbon on the electrodes.

8. The method of converting an electric arc into an elongated flame, with the arc of a type developed between concentric electrodes, said method consisting in passing a blast of a water gas across the electric arc, the decomposition of the gas incident to its passage through the arc depositing carbon on the electrodes.

ENGELBERT WIST.